Figures 1, 2:
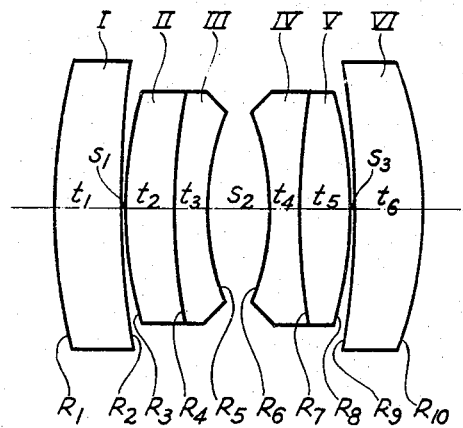

July 12, 1949.  F. E. ALTMAN  2,475,938
FOUR-COMPONENT OBJECTIVE FOR MICROCOPYING CAMERAS
Original Filed Nov. 20, 1943

| E.F.=100 mm. | | | PETZVAL SUM=+.0014 | |
|---|---|---|---|---|
| LENS | $N_D$ | V | RADII | SPACINGS |
| I | 1.744 | 45.8 | $R_1 = +56.0$ mm. | $t_1 = 6.9$ mm. |
| | | | $R_2 = +267.0$ mm. | $s_1 = 0.2$ mm. |
| II | 1.617 | 55.0 | $R_3 = +40.8$ mm. | $t_2 = 4.9$ mm. |
| III | 1.617 | 36.6 | $R_4 = +58.3$ mm. | $t_3 = 3.3$ mm. |
| | | | $R_5 = +25.8$ mm. | $s_2 = 5.9$ mm. |
| IV | 1.617 | 36.6 | $R_6 = -24.2$ mm. | $t_4 = 3.3$ mm. |
| V | 1.617 | 55.0 | $R_7 = +72.5$ mm. | $t_5 = 4.9$ mm. |
| | | | $R_8 = -40.0$ mm. | $s_3 = 0.2$ mm. |
| VI | 1.744 | 45.8 | $R_9 = -114.0$ mm. | $t_6 = 6.9$ mm. |
| | | | $R_{10} = -39.0$ mm. | B.F.= 89.0 mm. |

Fred E. Altman
INVENTOR
BY
ATT'Y. & AG'T.

Patented July 12, 1949

2,475,938

UNITED STATES PATENT OFFICE 2,475,938

FOUR-COMPONENT OBJECTIVE FOR MICROCOPYING CAMERAS

Fred E. Altman, Rochester, N. Y., assignor to Eastman Kodak Company, Rochester, N. Y., a corporation of New Jersey Original application November 20, 1943, Serial No. 511,059. Divided and this application February 13, 1946, Serial No. 647,233

3 Claims. (Cl. 88—57)

This is a division of my application No. 511,059, entitled "Wide-angle telescope objectives," filed November 20, 1943, and which has become Patent No. 2,401,324, dated June 4, 1946. It relates particularly to the objective shown in Fig. 3 with data given as Example 3 of the parent case. This objective is useful as a photographic lens, especially when very sharp definition is desired over an angular field of about 25° from the axis. It has some important features of the invention described in the parent case, but its Petzval sum is positive rather than negative as in the case of the other examples to which the parent case is specifically drawn. It also differs from the other examples in certain related features, such as radii of curvature and thickness of components which will be described in greater detail in connection with the drawing.

The present invention relates to objectives and applies particularly to that type of objective consisting of two collective members separated by a central airspace, each member comprising a thick meniscus component strongly concave toward the central airspace and at least one positive component on the convex side of the meniscus component. By "thick" is meant thicker than about 0.08 F, where F is the focal length of the objective, and by "strongly concave" is meant with a radius of curvature less than F.

This type of objective is well known and widely used in photography, both at finite conjugates and for distant objects. In its most common form the thick meniscus components are negative doublets comprising a positive and a negative element, and there are two positive components, one in front and one in the rear, each of which is a single positive element with its outer surface the more strongly curved.

The invention is equally applicable to variations from this form, such as those which have one or more compound positive components combined with the compound meniscus components.

According to the invention, the surfaces bounding the central airspace have radii of curvature less than F/3, and the positive elements, particularly the outer positive elements, have unusually high indices of refraction. In general, as these refractive indices are higher, the concave inner surfaces may be weaker while still effectively embodying the invention, since the high index of the positive elements aids in correcting the Petzval sum. These refractive indices may be as high as obtainable. At the present time published types of glass go nearly to 2.1 in refractive index.

The present embodiment of the invention is best described by a relationship between these innermost radii of curvature and the index of the outer components since both contribute to Petzval correction as described above. According to this relationship, the positive elements have refractive indices greater than 1.60, and the average radius of curvature of the inner negative surfaces is less than $(0.25\ No.\ P.-0.16)F$ where $No.\ P.$ is the average refractive index of the two outer positive elements with respect to the D line of the spectrum. For example, a limiting average radius of 0.265 F would correspond to $No.\ P.=1.70$. Thus, less strongly curved inner surfaces embody the invention effectively when the index of the outer positive elements is higher, as described above.

In the most preferred embodiment of the invention at least one positive element in each of the two members which make up the objective has a refractive index greater than 1.66 and a dispersive greater than 35.

The accompanying drawing, Figure 1, shows the objective of Fig. 3 of the parent case and Figure 2, the constructional data corresponding to the same, as given under Example 3 of the parent case. This data is as follows:

| Lens | N | V | Radii | Thicknesses |
|---|---|---|---|---|
| I | 1.744 | 45.8 | $R_1=+56.0$ mm. | $t_1=6.9$ mm. |
|  |  |  | $R_2=+267$ | $s_1=0.2$ |
|  |  |  | $R_3=+40.8$ |  |
| II | 1.617 | 55.0 |  | $t_2=4.9$ |
|  |  |  | $R_4=+58.3$ |  |
| III | 1.617 | 36.6 |  | $t_3=3.3$ |
|  |  |  | $R_5=+25.8$ |  |
|  |  |  |  | $s_2=5.9$ |
|  |  |  | $R_6=-24.2$ |  |
| IV | 1.617 | 36.6 |  | $t_4=3.3$ |
|  |  |  | $R_7=+72.5$ |  |
| V | 1.617 | 55.0 |  | $t_5=4.9$ |
|  |  |  | $R_8=-40.0$ |  |
|  |  |  |  | $s_3=0.2$ |
|  |  |  | $R_9=-114$ |  |
| VI | 1.744 | 45.8 |  | $t_6=6.9$ |
|  |  |  | $R_{10}=-39.0$ | B. F.$=89$ |

As in all the other examples of the parent case, the inner concave surfaces $R_5$ and $R_6$ have radii of curvature less than F/3 and the average index of the positive elements is greater than 1.6 in accordance with the invention.

In this example all the positive elements have refractive indices greater than 1.6 and both outer positive elements have a refractive index greater than 1.66 and a dispersive index greater than 35 in accordance with a preferred feature of the invention. The quantity $(0.25\ No.\ P.-0.16)F$ corresponding to the index 1.744 has the value 27.6, and both inner radii $R_5$ and $R_6$ are smaller than this value in accordance with another feature of the invention described above.

As mentioned above in the introductory paragraph, this example having a positive Petzval sum differs from the other examples of the parent case in respect to certain radii of curvature and thicknesses. In particular the inner concave surfaces have radii greater than 0.21 F and the negative components are less than 0.13 F thick, thus lying on the opposite side of these limits with respect to all the other examples.

It was also found advantageous in this example to make the positive components meniscus in shape, concave toward the negative components, and to make the rear component more strongly meniscus than the front component. By "more strongly meniscus" is meant that its convex outer surface $R_{10}$ and its concave inner surface $R_9$ are more strongly curved than the corresponding surfaces of the front component.

I claim:

1. An objective consisting of two collective members separated by a central airspace, each member consisting of a compound negative meniscus component concave toward the central airspace and having a thickness between 0.08 F and 0.13 F, F being the focal length of the objective, and a positive meniscus element spaced from the convex side of the negative component and concave thereto, the objective having a positive Petzval sum and being characterized by the refractive index of each positive element being between 1.6 and 2.1 with respect to the D line of the spectrum, by the two outer positive elements having refractive indices greater than 1.66 and dispersive indices greater than 35, and by the radius of curvature of each of the concave surfaces bounding the central airspace being greater than 0.21 F and less than $(0.25\ N_{o.\ P.} - 0.16)F$ where $N_{o.\ P.}$ is the average refractive index of the two outer positive elements.

2. An objective as claimed in claim 1 further characterized by the rear positive element being more strongly meniscus than the front positive element.

3. An objective consisting of two negative meniscus doublets axially aligned between two positive meniscus single elements, all concave toward the central airspace, in which the refractive indices N, the dispersive indices V, the radii of curvature R, the thicknesses $t$ and the spaces $s$, each numbered in order from front to rear, are according to the following specifications:

| | | | |
|---|---|---|---|
| $N_1=1.74$ | $V_1=46$ | $R_1=0.6\ F$ | $t_1=0.07\ F$ |
| | | $R_2=3\ F$ | $s_1<0.01\ F$ |
| $N_2=1.62$ | $V_2=55$ | $R_3=0.4\ F$ | $(t_2+t_3)=0.09\ F$ |
| $N_3=1.62$ | $V_3=37$ | $R_4>0.5\ F$ | |
| | | $R_5=F/4$ | $s_2=0.06\ F$ |
| $N_4=1.62$ | $V_4=37$ | $R_6=F/4$ | $(t_4+t_5)=0.08\ F$ |
| $N_5=1.62$ | $V_5=57$ | $R_7>0.5\ F$ | |
| | | $R_8=0.4\ F$ | $s_3<0.01\ F$ |
| $N_6=1.74$ | $V_6=46$ | $R_9=1.1\ F$ | $t_6=0.07\ F$ |
| | | $R_{10}=0.4\ F$ | | in which F is the focal length of the objective.

FRED E. ALTMAN.

REFERENCES CITED

The following references are of record in the file of this patent:

UNITED STATES PATENTS

| Number | Name | Date |
|---|---|---|
| 583,336 | Rudolph | May 25, 1897 |
| 2,343,627 | Aklin | Mar. 7, 1944 |
| 2,389,016 | Wynne | Nov. 13, 1945 |
| 2,401,324 | Altman | June 4, 1946 |

FOREIGN PATENTS

| Number | Country | Date |
|---|---|---|
| 157,040 | Great Britain | Jan. 20, 1921 |
| 323,138 | Great Britain | Dec. 24, 1929 |
| 423,468 | Great Britain | Feb. 1, 1935 |